US007952995B2

(12) United States Patent
Sung

(10) Patent No.: US 7,952,995 B2
(45) Date of Patent: May 31, 2011

(54) APPARATUS AND METHOD FOR PROVIDING VOIP SERVICE

(75) Inventor: Jung-Sic Sung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1774 days.

(21) Appl. No.: 10/996,374

(22) Filed: Nov. 26, 2004

(65) Prior Publication Data

US 2005/0135391 A1 Jun. 23, 2005

(30) Foreign Application Priority Data

Dec. 17, 2003 (KR) .......................... 10-2003-0092733

(51) Int. Cl.
*H04L 12/26* (2006.01)
(52) U.S. Cl. ......... 370/229; 370/236; 370/401; 709/245
(58) Field of Classification Search .................. 370/229, 370/401, 352, 400, 236; 709/245
See application file for complete search history.

(56) References Cited

U.S. PATENT DOCUMENTS

| | | | |
|---|---|---|---|
| 6,674,758 | B2 | 1/2004 | Watson |
| 6,687,245 | B2 | 2/2004 | Fangman et al. |
| 7,369,537 | B1 | 5/2008 | Kirchhoff et al. |
| 2003/0013467 | A1* | 1/2003 | Caloud .......................... 455/466 |
| 2003/0161295 | A1 | 8/2003 | Shah et al. |
| 2003/0219011 | A1 | 11/2003 | Han |
| 2004/0013118 | A1 | 1/2004 | Borella |
| 2004/0017818 | A1 | 1/2004 | Chung |
| 2004/0059942 | A1 | 3/2004 | Xie |
| 2004/0085952 | A1 | 5/2004 | Watson |
| 2004/0139230 | A1 | 7/2004 | Kim |
| 2004/0252683 | A1 | 12/2004 | Kennedy et al. |
| 2005/0018657 | A1 | 1/2005 | Nakao et al. |
| 2005/0111450 | A1 | 5/2005 | Miyamoto et al. |
| 2005/0117605 | A1* | 6/2005 | Yan et al. ...................... 370/469 |
| 2005/0122963 | A1 | 6/2005 | Jeon et al. |
| 2005/0201357 | A1 | 9/2005 | Poyhonen |
| 2005/0213564 | A1 | 9/2005 | Nguyen et al. |
| 2005/0254482 | A1 | 11/2005 | Yeom |

(Continued)

FOREIGN PATENT DOCUMENTS

EP    1 545 096    6/2005

(Continued)

OTHER PUBLICATIONS $2^{nd}$ European Office Action for Korean Patent Application No. 2003-92733 issued on Oct. 30, 2006.
"SIP: Session Initiation Protocol" to Handley, et al. Standards Track (1999).

(Continued)

*Primary Examiner* — Simon Sing
*Assistant Examiner* — Simon King
(74) *Attorney, Agent, or Firm* — H.C. Park & Associates, PLC

(57) ABSTRACT

An apparatus and method for providing VoIP service, where, in the case that a plurality of public IP terminals or PCs are connected to a private network using a public IP address, a switching system manages port information which is used by each of the IP terminals, switches a VoIP service request message or a response message, and notifies port information of the other IP terminal, and the IP terminal included in the private network connects a call to the other IP terminal so as to receive the VoIP service, so that a voice packet can be exchanged.

18 Claims, 9 Drawing Sheets

U.S. PATENT DOCUMENTS

| | | | |
|---|---|---|---|
| 2005/0286501 A1 | 12/2005 | Higuchi | |
| 2006/0098635 A1* | 5/2006 | Ravindranath et al. | 370/352 |
| 2006/0193308 A1 | 8/2006 | Sung | |
| 2006/0193319 A1 | 8/2006 | Sung | |
| 2006/0209794 A1 | 9/2006 | Bae et al. | |
| 2006/0250992 A1 | 11/2006 | Jabri et al. | |
| 2007/0053289 A1* | 3/2007 | March et al. | 370/229 |
| 2007/0217408 A1 | 9/2007 | Sahashi et al. | |
| 2008/0273079 A1 | 11/2008 | Campbell et al. | |

FOREIGN PATENT DOCUMENTS

| | | |
|---|---|---|
| JP | 2005-020080 | 1/2005 |
| KR | 10-2005-0042581 | 5/2005 |
| KR | 10-2005-0060988 | 6/2005 |
| WO | WO 02/03217 A1 | 1/2002 |
| WO | WO 02/082794 | 10/2002 |

OTHER PUBLICATIONS

"The IP Network Address Translator (NAT)", K. Egevang et al., Request for Comments: 1631, Network Working Group, May 1994.

Office Action (Paper No. 20090520) from U.S. Patent Office issued in Applicant's corresponding U.S. Appl. No. 11/350,073 dated Jun. 10, 2009.

European Search Report for European Patent Application No. EP 04030019, dated Apr. 4, 2005.

*Office action* from the State Intellectual Property Office of People's Republic of China issued in Applicant's corresponding Chinese Patent Application No. 200410104538.3 dated Aug. 18, 2006.

Office Action from U.S. Patent Office issued in Applicant's coresponding U.S. Appl. No. 11/350,073 dated Nov. 25, 2008.

Office Action from U.S. Patent Office issued in Applicant's Corresponding U.S. Appl. No. 11/349,240 dated Dec. 9, 2008.

* cited by examiner

| No. | PRIVATE IP | | PUBLIC IP | |
|---|---|---|---|---|
| | IP ADDRESS | Port | IP ADDRESS | Port |
| 1 | 10.10.10.10 | 6000 | 201.111.198.40 | 7500 |
| 2 | 10.10.10.10 | 9000 | 201.111.198.40 | 7600 |
| 3 | 10.10.10.11 | 7000 | 201.111.198.40 | 7700 |
| 4 | 10.10.10.11 | 8000 | 201.111.198.40 | 7800 |
| ... | ... | ... | ... | ... |

| PHONE NUMBER | IP ADDRESS | SIGNALING PORT | PACKET PORT |
|---|---|---|---|
| 3100 | 201.111.198.40 | 7500 | 7600 |
| 3200 | 201.111.198.20 | 6000 | 9000 |
| 3300 | | | |
| ... | ... | ... | ... |

FIG. 9A

| ETHERNET HEADER FIELD (a) | 10.10.10.10 (b) | 201.111.198.30 (c) | 6000 (d) | 6000 (e) | 3100+PORT SORT INFORMATION (f) |

FIRST LINK TEST Msg

FIG. 9B

| ETHERNET HEADER FIELD (a) | 10.10.10.10 (b) | 201.111.198.30 (c) | 9000 (d) | 9000 (e) | 3100+PORT SORT INFORMATION (f) |

SECOND LINK TEST Msg

FIG. 9C

| ETHERNET HEADER FIELD (a) | 210.111.198.40 (b) | 201.111.198.30 (c) | 7500 (d) | 6000 (e) | 3100+PORT SORT INFORMATION (f) | FIRST LINK TEST Msg |

FIG. 9D

| ETHERNET HEADER FIELD (a) | 210.111.198.40 (b) | 201.111.198.30 (c) | 7600 (d) | 9000 (e) | 3100+PORT SORT INFORMATION (f) | SECOND LINK TEST Msg |

# APPARATUS AND METHOD FOR PROVIDING VOIP SERVICE

CROSS REFERENCE TO RELATED APPLICATIONS AND CLAIMS PRIORITY

This application makes reference to, incorporates the same herein, and claims all benefits accruing under 35 U.S.C. §119 from an application for APPARATUS AND METHOD FOR PROVIDING VoIP SERVICE earlier filed in the Korean Intellectual Property Office on 17 Dec. 2003 and there duly assigned Serial No. 2003-92733. Furthermore, the present application is related to two U.S. applications:1) Ser. No. 11/349,240 and now published as U.S. 2006/0193308; and 2) Ser. No. 11/350,073 and now published as 2006/0193319.

BACKGROUND OF THE INVENTION

1. Field of the Invention

The present invention relates to an apparatus and method for providing VoIP service and, more specifically, to an apparatus and method for providing a private network with VoIP service, where an IP terminal included in the private network and an IP terminal included in a public network set a call therebetween and exchange a voice packet according to the VoIP.

2. Description of the Related Art

Currently, an interest in VoIP (Voice over Internet Protocol) service is increasing due to the high spread of the Internet. Such VoIP service provides a phone user with long distance call service or international call service in an Internet environment or an Intranet environment with a local phone service fare, by integrating the phone service using an IP network. And, an SIP (Session Initiation Protocol), an MGCP (Media Gateway Control Protocol), and an H.323 are defined in the VoIP.

The SIP is a simple text-based application-layer control protocol, with which at least one of the participants generates, corrects or terminates a session all together. Such session includes Internet-based video conference, telephone, interview, event notification, and instant messaging.

An MGCP is a standard protocol for signal operation and session management needed in progress of a multimedia conference, which is also known as 'H.248' or 'Megaco'. The H.323 is a standard defined by 'ITU-T' in order to transmit data of the multimedia video conference through a network of a packet exchange scheme such as TCP/IP.

Since public IP addresses of the IPv4 address system are gradually exhausted, a method for solving a problem of the insufficient public IP address using NAT (Network Address Translation) or other methods was suggested. Such NAT is used to solve the exhaustion of the public IP address problem by making the IP network use a small number of public IP addresses, and is described in a general agreement of 'RFC (Request for Comments) 1631'.

The IP network having a general public network includes a private network using a private IP addresses, a public network using a public IP addresses, a network address converter for converting the private IP addresses used in the private network to a corresponding public IP addresses, and a switching system. When a user uses VoIP service through the private IP terminal in the IP network, the private IP terminal generates a call connection request message according to phone number information inputted by the user and transmits the message to the IP network.

The network address converter converts a source IP address in the call connection request message transmitted from the private IP terminal, that is, converts the address from the private IP address to a corresponding public IP address. The switching system identifies an incoming IP address of a call connection request message transmitted from the network address converter, and transmits the call connection request message to the corresponding IP terminal. When the public IP terminal responds to the call connection request message, a call is connected between the private IP terminal and the public IP terminal, and voice communication is performed according to the VoIP.

However, such a method can be used only in the case that a private IP terminal is connected to another private network. That is, when a plurality of private IP terminals or PCs are connected to each other through a private network, the network address converter converts the source IP address of the message transmitted from each of the private IP terminals or PCs into the same public IP address. Since a destination IP address of a packet transmitted from the public IP terminal is a public IP address that is converted by the network address converter, it is not possible to transmit such a packet to a specific private IP terminal or PC. Therefore, it is not possible to provide VoIP service between a public IP terminal and a private IP terminal.

On the other hand, in the case that the public IP terminal transmits a call connection request message to the private IP terminal, the switching system identifies an incoming public IP address transmitted from the public IP terminal, and transmits the call connection request message to the network address converter. When there are a plurality of private IP terminals or PCs that use a single incoming public IP address, the network address converter cannot convert the public IP address to the private IP address since it cannot uniquely determine which specific private IP terminal or PC is to receive the call connection request message transmitted from the public IP terminal.

Accordingly, when the private network having one public IP address is connected to the plurality of private IP terminals, the public IP terminal cannot transmit a call connection request message to an incoming private IP terminal, making it impossible to provide VoIP service between a public IP terminal and a private IP terminal. What is therefore needed is an apparatus and method for providing VoIP service between public IP terminals and private IP terminals.

SUMMARY OF THE INVENTION

It is therefore an object of the present invention to provide an apparatus that allows a public IP terminal to connect to and communicate via VoIP with a private IP terminal in a private IP network.

It is also an object of the present invention to provide a method for providing VoIP communication between a public IP terminal and a private IP terminal.

It is further an object to provide a method and an apparatus that enables a public IP terminal to uniquely identify and connect with a private IP termal in a private IP network that has a plurality of IP terminals.

It is also an object of the present invention to provide an apparatus and method for providing VoIP service, wherein a higher level of VoIP service is provided by transmitting a call connection request message to an incoming private IP terminal from a public IP terminal even in the case that a private network having one public IP address is connected to a plurality of private IP terminals or PCs.

These and other objects can be achieved by a system having at least one IP terminal for generating a test message including port information used when exchanging a packet and providing the message to a network, when the IP terminals are connected to the network and a switching system for storing and managing the port information of each of the IP terminals through the test message provided from the IP terminal, transmitting the port information of the other IP terminal to any one of an outgoing terminal and an incoming IP terminal in a case that VoIP service for the IP terminal included in a private network is requested, and allowing each of the IP terminals to exchange the packet using the transmitted port information.

Preferably, the system for providing VoIP service according to the present invention further includes an address conversion unit for converting a private IP address set in the test message to a corresponding public IP address when the IP terminal is connected to the private network. Preferably, the address conversion unit stores public IP address information corresponding to private IP address information of the IP terminal connected to the private network and port information corresponding to the port information of the corresponding IP terminal, and changes the private IP address information to the corresponding public IP address information and the port information to the corresponding port information, when the test message or voice packet are transmitted from the IP terminal.

Preferably, the IP terminal includes a storage unit for storing IP address information, port information and phone number information of the IP terminal, a message generation unit for periodically generating the test message using each information stored in the storage unit, a packet processing unit for, when a call is set to the other IP terminal, generating the voice packet to receive the VoIP service and transmitting the voice packet using address information and port information of the other IP terminal, and a network interface for outputting the test message and the voice packet through the network.

Preferably, the switching system includes a reception unit for receiving the test message, voice packet and VoIP service request message transmitted from the IP terminal, a port management unit for managing phone number information, IP address information and port information of the corresponding IP terminal through the test message received by the reception unit, a storage unit for storing each information managed in the port management unit, and a port processing unit for, when a VoIP service request message is transmitted from the outgoing IP terminal, searching for the port information of the outgoing IP terminal from the storage unit, including the searched port information in the VoIP service request message and transmitting the VoIP service request message to the incoming IP terminal, and for, when a response message is transmitted from the incoming IP terminal, searching for the port information of the incoming IP terminal from the storage unit, including the searched port information in the response message, and transmitting the response message to the outgoing IP terminal.

According to another aspect of the present invention, there is provided an IP terminal for providing VoIP service, the IP terminal having a user interface for providing an input signal and a voice signal according to user's selection, a memory for storing port information of the IP terminal, a message generation unit for generating a test message including the port information stored in the memory, a VoIP service request message according to the input signal provided from the user interface, and a voice packet according to the voice signal; and a packet exchange unit for transmitting each message generated in the message generation unit from the switching system, identifying the port information included in each message when receiving the VoIP service request message or a response message, and transmitting the voice packet generated in the message generation unit using the port 11 information when a call is connected to the other IP terminal.

According to yet another aspect of the present invention, there is provided an address conversion unit for interworking between a private network with a public network, the address conversion unit having a storage unit for storing public IP address information corresponding to private IP address information of a private IP terminal connected to the private network, and port information corresponding to port information of the corresponding IP terminal, and an address processing unit for, when a packet is received from the private IP terminal, changing the private IP address to a corresponding public IP address and transmitting a packet of port information corresponding to the port information in which the packet is received, and for, when a packet is received from the public network, searching for the private IP address corresponding to a destination IP address and port information corresponding to the port information in which the packet is received, and transmitting the packet to the private IP address using the searched port information.

According to yet another aspect of the present invention, there is provided a switching system connected to a plurality of IP terminals, the switching system having a message reception unit for receiving a test message including port information, a VoIP service request message and a response message from each of the IP terminals, a port management unit for managing the port information of the corresponding IP terminal when the test message is received by the message reception unit, and a message transmission unit for, when a VoIP service request signal is transmitted from an arbitrary outgoing IP terminal through the message reception unit, searching for port information of the outgoing IP terminal, including the searched port information in the VoIP service request message and transmitting the message to an incoming IP terminal, and for, when a response message is transmitted from the incoming IP terminal, searching for port information of the incoming IP terminal, including the searched port information in the response message, and transmitting the response message to the outgoing IP terminal.

According to yet another aspect of the present invention, there is provided a method for providing VoIP service in at least one IP terminal connected to a private network or a public network, and a system including a switching system, the method including generating a test message including port information and transmitting the message to a network, when each of the IP terminals is connected to the network, allowing the switching system to identify the port information through the test message transmitted from the IP terminal and to manage the information as a port table, searching for the port information of an outgoing IP terminal from the port table, including the searched port information in a VoIP service request message and transmitting the request message to an incoming IP terminal, when the VoIP service request message is received from the outgoing IP terminal; searching for the port information of the incoming IP terminal, including the searched port information in a response message, and transmitting the response message to the outgoing IP terminal, when the response message is received from the incoming IP terminal, and when a call is set between each of the IP terminals, allowing each of the IP terminals to exchange a voice packet used to receive the VoIP service through port information of the other IP terminal transmitted from the switching system. Preferably, the method for providing the private network with the VoIP service further includes, when the test message is received from the IP terminal connected to the private network, changing the test message to a public IP address corresponding to the private IP address set in the test message.

According to yet another aspect of the present invention, there is provided a method for providing VoIP service by an IP terminal connected to a switching system, the method including generating a test message including port information used to exchange a packet and transmitting the test message to the switching system, when connected to a network, identifying port information of the other IP terminal in the message transmitted from the switching system, when the switching system connects a call to the other IP terminal, generating a voice packet to provide the VoIP service, and transmitting the voice packet to the other IP terminal through the identified port information, and outputting voice information according to the voice packet transmitted from the other IP terminal, and providing the VoIP service.

According to yet another aspect of the present invention, there is provided a method for processing address information by a address conversion unit, the method including storing private IP address information of each of private IP terminals connected to a private network, public IP address information corresponding to port information, and port information, searching for a public IP address corresponding to the private IP address information of the IP terminal and changing the IP address, when a packet is transmitted from the IP terminal, and searching for port information corresponding to the port information receiving the packet and transmitting the packet in which the IP address is changed through the searched port information.

According to yet another aspect of the present invention, there is provided a method for providing VoIP service by a switching system connected to at least one IP terminal connected to a private network or a public network, the method including identifying port information in a test message transmitted from each of the IP terminals and managing the port information as a port table, when a VoIP service request message is transmitted from an outgoing IP terminal, searching for the port information of the outgoing IP terminal, including the searched port information in the VoIP service request message, and transmitting the VoIP service request message to an incoming IP terminal; when a response message is transmitted from the incoming IP terminal, searching for the port information of the incoming IP terminal, including the searched port information in the response message, and transmitting the response message to the outgoing IP terminal; and connecting a call to provide the VoIP service between the incoming IP terminal and the outgoing IP terminal.

BRIEF DESCRIPTION OF THE DRAWINGS

A more complete appreciation of the present invention, and many of the attend advantage thereof, will become readily as the same becomes better understand by reference to the following detailed description when considered in conjunction with the accompanying drawings in which like reference symbol indicate or similar components, wherein:

FIGS. 9A and 9B are diagrams for explaining a construction of first and second link test messages that a private IP terminal transmits according to an embodiment of the present invention;

FIGS. 9C and 9D are diagrams for explaining first and second link test messages transmitted by a router in accordance an embodiment of the present invention;

DETAILED DESCRIPTION OF THE INVENTION

Figure 1:
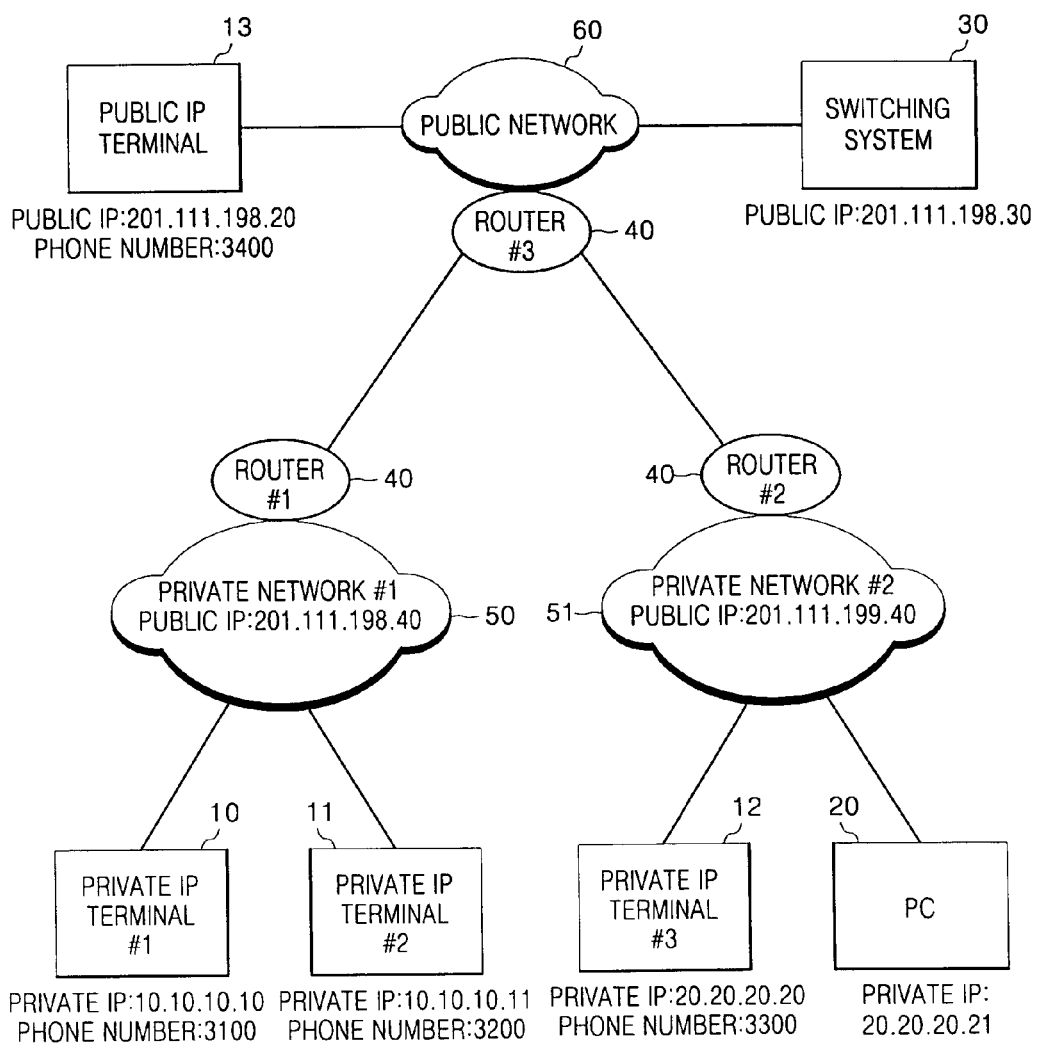
FIG. 1 is a block diagram for explaining an entire construction of an IP network including a general private network according to the principles of the present invention.

Turning now to the figures, FIG. 1 is a block diagram for explaining an entire construction of an IP network including a general private network. As illustrated in FIG. 1, the IP network includes a plurality of private IP terminals 10, 11 and 12 connected to a plurality of private networks 50 and 51, a public IP terminal 13 connected to a public network 60, a PC (Personal Computer) 20, a switching system 30 and a plurality of routers 40. The public IP terminal 13 means an IP terminal which uses a public IP address (global IP address), and a public IP address used in the public network 60 means an IP address unique in the world, which is used after being assigned from domestic and overseas IP address management groups.

In the following description of the present invention, while a case that the public IP address is a 32-bit IP address according to the 'IPv4' address system is explained, a 128-bit IP address according to the 'IPv6' address system can also be explained in the same manner. The private IP terminals 10, 11 and 12 refer to IP terminals which are using private IP addresses, and the private addresses used in the private networks 50 and 51 refer to IP addresses whose object is to be used only in a unit or other organization.

The PC 20 is connected to the IP network using the private IP address used in the private network 51, and provides a user with web surfing or material search service. The plurality of routers 40 route a receiving packet and transmit the corresponding packet to a destination. The router 40 changes a source IP address of the packet transmitted from the private IP terminals 10, 11 and 12 to a public IP address corresponding to the private IP address, and a destination IP address of the packet received from the public network 60 to a private IP address corresponding to the public IP address. The router 40 identifies a port with which each of the private IP terminals 10, 11 and 12 exchanges the packet in order that each of the private IP terminals 10, 11 and 12 receives the packet transmitted from the public network 60, and transmits the packet through the port. When a call connection request message is transmitted from the IP terminal 1x, the switching system 30 identifies an incoming IP terminal 1x and switches to connect a call through an IP network between an outgoing IP terminal 1x and an incoming IP terminal 1x.

Figure 2:
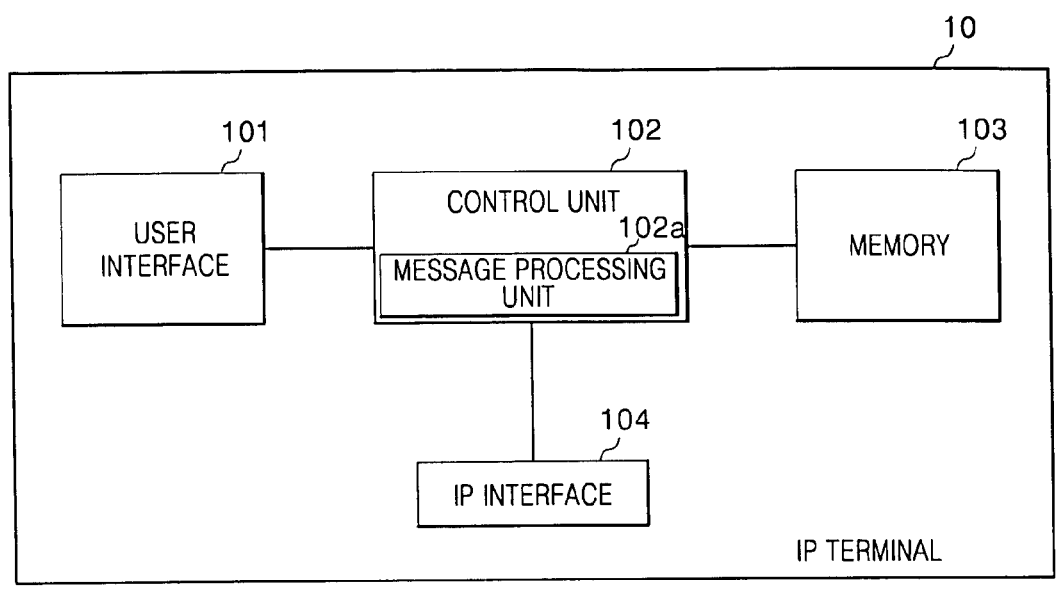
FIG. 2 is an internal block diagram for explaining a construction of an IP terminal according to a preferred embodiment of the present invention.

Turning now to FIG. 2, FIG. 2 is an internal block diagram for explaining a construction of an IP terminal 10 of FIG. 1 according to a preferred embodiment of the present invention. Referring to FIG. 2, the IP terminal 10 according to the present invention includes a user interface 101, a control unit 102, a memory 103 and an IP interface 104, the control unit 102 having a message processing unit 102a.

The user interface 101 provides an input signal according to a selection of the user, and a voice signal according to voice information inputted by the user. The user interface 101 outputs the voice information according a voice signal provided by the other IP terminal 10 in order that the user can listen to the voice information, so that the user can perform voice communication according to VoIP. The memory 103 stores the public or private IP address information assigned to the IP terminal 10, along with operational information and port information of the IP terminal 10. The control unit 102 generates the call connection request message according to the input signal provided from the user interface 101 and transmits the message to the other IP terminal 10. The control unit 102 also generates a voice packet according to the voice signal provided from the user interface 101 and transmits the message to an incoming IP terminal 10 when a call for the voice communication is connected to the other IP terminal 10.

When the control unit 102 receives the call connection request message from the other IP terminal 10, control unit 102 generates a response message with respect to the call connection request message, and transmits the message to the other IP terminal 10. When the IP terminal 10 is connected to the switching system 30 through the IP network, the message processing unit 102a generates a link test message (LinkTest-Msg) in a desired period and transmits the message to the switching system 30.

Information included in the link test message is phone number information of the corresponding IP terminal 10, IP address information, signaling port information, packet port information and port sort information. Here, the signaling port is a port with which the IP terminal 10 exchanges a signaling message, and the packet port is a port with which the IP terminal 10 exchanges the voice packet in the state of a call connection.

The message processing unit 102a periodically generates a link test message including all of the signaling port information and packet port information and transmits the message to the switching system 30, or periodically generates a first link test message including the signaling port information and a second link test message including the packet port information and transmits both messages to the switching system 30. Hereinafter, the detailed description of the present invention explains the case that the IP terminal 10 periodically generates the first link test message including the signaling port information and the second link test message including the packet port information, and transmits both messages to the switching system 30.

Figure 3:
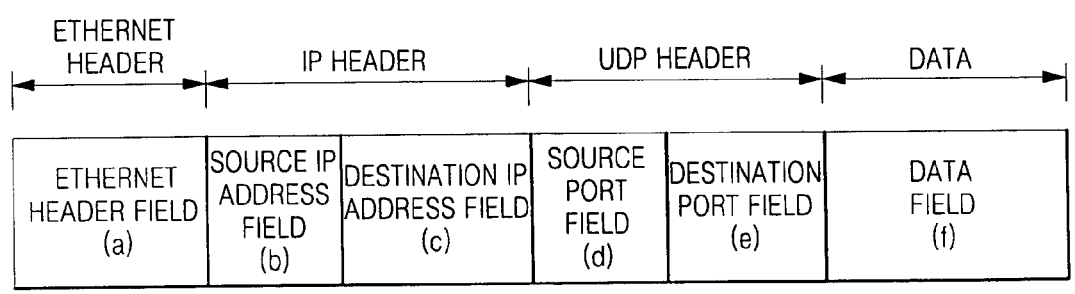
FIG. 3 is a diagram for explaining a general packet construction.

Turning now to FIG. 3, FIG. 3 is a diagram for explaining a general packet construction. Referring to FIG. 3, the packet is largely divided into an Ethernet header area, an IP header area, a UDP header (or User Datagram Protocol header) area, and a data area. The IP header area includes a source IP address field (b) and a destination IP address field (c), and the UDP header area includes a source port field (d) and a destination port field (e). The source IP address field (b) sets 32-bit IP address information of the IP terminal 10, and the destination IP address field (c) sets a 32-bit IP address of the last destination of the packet. The source port field (d) has 16-bit port number information used to transmit data in an application, and the destination port field (e) has destination port number information of data in the application.

The message processing unit 102a sets the private IP address information assigned by the IP terminal 10 from the private network 50 in the source IP address field (b) of the packet, public IP address of the switching system 30 in the destination IP address field (c), the signaling port information in the source port field (d), the port information of the switching system 30 in the destination port field (e), the port sort information of the source port field (d) in the data field (f), and the phone number information, and generates the first link test message in a desired period.

The message processing unit 102a sets the private IP address information assigned from the private network 50 by the IP terminal 10 in the source IP address field (b) of the packet, the public IP address of the switching system 30 in the destination IP address field (c), the packet port information in the source port field (d), the port information of the switching system 30 in the destination port field (e), the port sort information of the source port field (b) in the data filed (f), and the phone number information, and generates the second test message in a desired period.

The IP interface 104 performs interface of the first and second link test messages generated by the message processing unit 102a so as to be transmitted to the switching system 30 through the IP network, and transmits the call connection request message generated by the control unit 102 according to the input signal provided from the user interface 101 to the other IP terminal 10 or receives the call connection request message from the other IP terminal 10. The IP interface unit 104 transmits the voice packet generated by the control unit 102 to the other IP terminal 10 or receives the voice packet transmitted from the other IP terminal 10 in the state that a call is set with the other IP terminal 10.

Figures 4, 5:
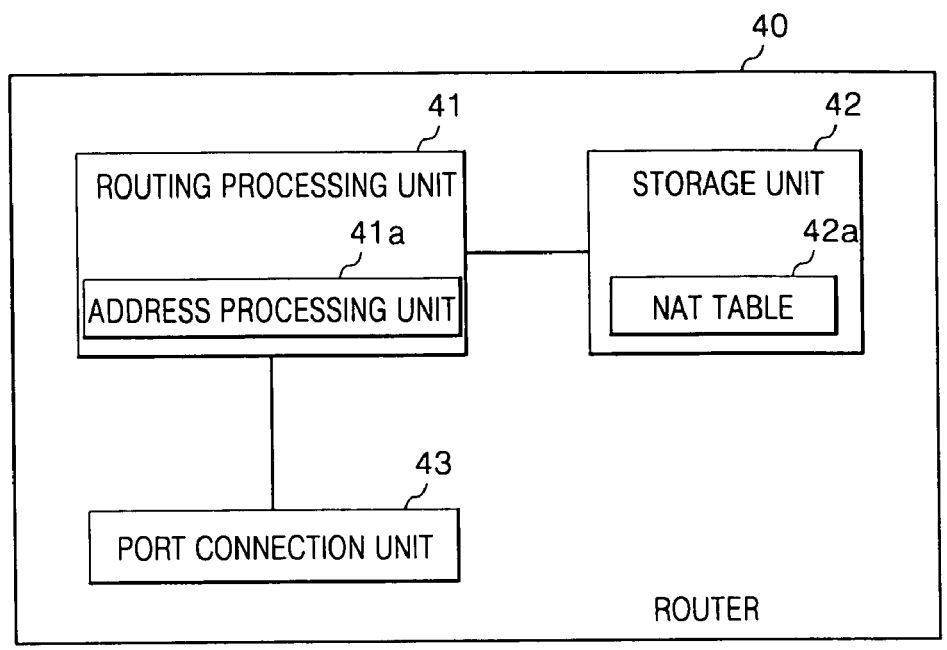
FIG. 4 is an internal block diagram for explaining a router construction according to a preferred embodiment of the present invention.
FIG. 5 is a diagram for explaining a NAT table according to the present invention.

Turning now to FIG. 4, FIG. 4 is an internal block diagram for explaining a router construction according to a preferred embodiment of the present invention. Referring to FIG. 4, the router 40 according to the present invention includes a routing processing unit 41, a storage unit 42 and a port connection unit 43. The routing processing unit 41 includes an address processing unit 41a, and the storage unit 42 stores a NAT (Network Address Translation) table 42a.

The port connection unit 43 receives a packet transmitted from the IP terminal or switching system 30 through a private network 50 or a public network 60, provides a routing processing unit 41 with the packet, and transmits a packet according to a routing result of the routing processing unit 41. The routing processing unit 41 analyzes a header of the packet provided from the port connection unit 43, searches for a route to transmit the packet to the final destination in a forwarding table (not shown), and transmits the packet using the searched route. The address processing unit 41a of the routing processing unit 41 searches for a public IP address corresponding to the source IP address information included in the header of the packet received through the port connection unit 43 from the NAT table 42a, and changes a source IP address of the packet to the searched public IP address.

Turning now to FIG. 5, FIG. 5 is a diagram for explaining a NAT table according to the present invention. Referring to FIG. 5, the NAT table 42a stores signaling port 21 information and packet port information of the IP terminal 10 having one private IP address information, and signaling port information and packet port information of the router 40 of the public IP address information corresponding to the information of the IP terminal 10. For example, in the case that a signaling port of the private IP terminal 10 whose private IP address is '10.10.10.10' is '6000', and its packet port is '9000', the corresponding IP terminal 10 periodically generates the first link test message including private IP address information and signaling port information and the second link test message including the private IP address information and the packet port information, and transmits the messages to the router 40.

The port connection unit 43 of the router 40 transmits each of the link test messages received from the private IP terminal 10 to the address processing unit 41a of the router processing unit 41. The address processing unit 41a stores the private IP address and the signaling port information included in the received first link test message, and identifies the public IP information and the signaling port information in which the router 40 transmits the signaling message and stores both information, correspondingly. That is, the address processing unit 41a stores the private IP address information of '10.10.10.10' and the signaling port information of '6000', and the corresponding public IP address information of '201.111.198.40' and the signaling port information of '7500'. The address processing unit 41a stores the private IP address and packet port information included in the received second link test message, and identifies the corresponding public IP address and the packet port information in which the router 40 transmits the packet and stores them, correspondingly.

That is, the address processing unit 41a stores the private IP address information of '10.10.10.10' and the packet port information of '9000', and the corresponding public IP address information of '201.111.198.40', and the packet port information of '7600'. At the same time, the address processing unit 41a changes the private IP address information set in the source IP address field (b) transmitted from the private IP terminal 10 to the public IP address stored in the NAT table 42a correspondingly, searches for the port information corresponding to the port information set in the source port field (d) from the NAT table 42a, and transmits the packet through the searched port.

The address processing unit 41a identifies the IP address information set in the destination IP address field (c) of the packet received through the public network 60 and the port information set in the destination port field (e), and searches for the private IP address information and port information stored in the NAT table 42a, correspondingly. The address processing unit 41a sets the private address information searched in the NAT table 42a in the destination address field (c) of the packet and transmits the information to the destination IP terminal 10 through the searched port.

Figures 6, 7:
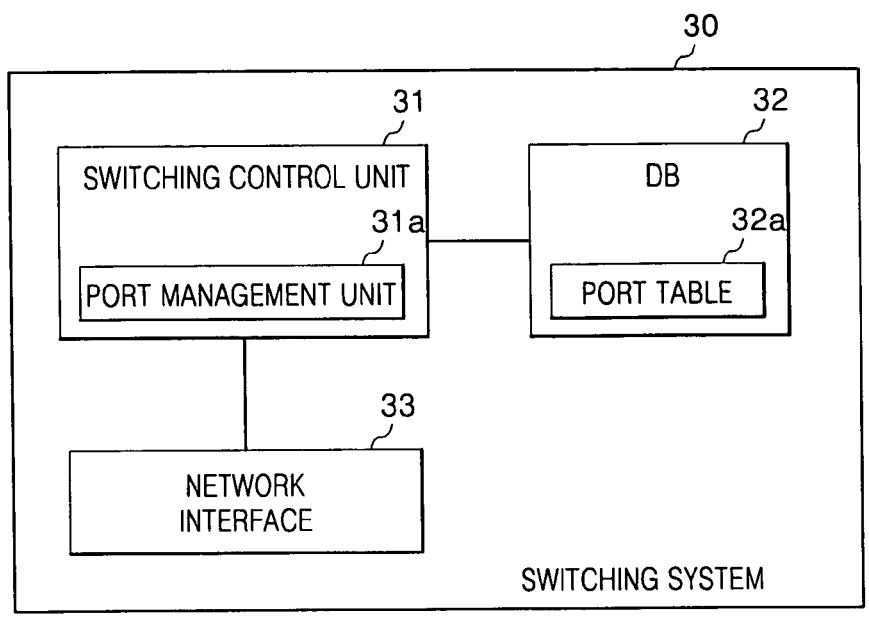
FIG. 6 is an internal block diagram for explaining a construction of a switching system according to a preferred embodiment of the present invention.
FIG. 7 is a diagram for explaining a port table according to a preferred embodiment of the present invention.

Turning now to FIG. 6, FIG. 6 is an internal block diagram for explaining a construction of a switching system 30 according to a preferred embodiment of the present invention. Referring to FIG. 6, the switching system 30 according to the present invention includes a switching control unit 31, a network interface 33, and a database DB 32, the switching control unit 31 includes a port management unit 31a, and the database 32 stores a port table 32a.

The network interface 33 receives a link test message, a voice packet and a call connection request message transmitted from the router 40 or the public IP terminal 13 through the public network 60, and provides the switching control unit 31 with them. The network interface 33 transmits the voice packet and call connection request message to the destination IP terminal according to the switching of the switching control unit 31. The switching control unit 31 identifies the incoming IP terminal 1x of the call connection request message received through the network interface 33, switches the call connection message to the incoming IP terminal 1x, and transmits a response message to the call connection request message received from the incoming IP terminal 1x to the outgoing IP terminal 1x.

When the call for the voice communication is connected to the incoming IP terminal 1x, the switching control unit 31 connects the call for voice communication to the outgoing IP terminal 1x, and connects the call between the incoming IP terminal 1x and the outgoing IP terminal 1x. The switching control unit 31 performs the switching to transmit the voice packet transmitted from the outgoing IP terminal 1x to the incoming IP terminal 1x in the state that the call is connected between the incoming IP terminal 1x and the outgoing IP terminal 1x, and to transmit the voice packet transmitted from the incoming IP terminal 1x to the outgoing IP terminal 1x. The port management unit 31a of the switching control unit 31 identifies phone number information, public IP address information and port information included in the link test message received through the network interface 33, generates the port table 32a, and stores the table in the database 32.

Turning now to FIG. 7, FIG. 7 is a diagram for explaining a port table according to a preferred embodiment of the present invention. Referring to FIG. 7, phone number information of the IP terminal 1x, public IP address information of the IP terminal 1x, signaling port information and packet port information are stored in the port table 32a. That is, the port management unit 31a identifies the IP address information from the source IP address field (b) of the first link test message received from the network interface 33, signaling information from the source port field (d) and phone number information from the data field (f), and stores the information in the port table 32a. The port management unit 31a identifies the IP address information from the source IP address field (b) of the second link test message received through the network interface 33, the packet port information from the source port field (d), and phone number information from the data field (f), and stores the information in the port table 32a.

At this time, since the first and second link test messages transmitted from one IP terminal 1x have the same phone number information and IP address information, it is desirable that one phone number information and IP address information are stored with respect to one IP terminal 1x, and the signaling port information and packet port information of the corresponding IP terminal 1x are stored so that the efficiency of using the storage area of the database 32 is maximized. The port management unit 31a identifies the IP address of the incoming IP terminal 1x of the call connection request message transmitted from the IP terminal 1× through the network interface 33, and transmits the public IP address information together with packet port information of the outgoing IP terminal 1x while it transmits the call connection request message to the corresponding incoming IP terminal 1x. When a response message with respect to the call connection request message is transmitted from the incoming IP terminal 1x, the public IP address information and the packet port information of the incoming IP terminal 1x are together transmitted to the outgoing IP terminal 1x. On the other hand, when a call for the voice communication is connected between the incoming IP terminal 1x and the outgoing IP terminal 1x, the incoming IP terminal 1x transmits the voice packet using the packet port information and the IP address of the outgoing IP terminal 1x transmitted together with the call connection request message, and the outgoing IP terminal 1x transmits the voice packet using the packet port information and the IP address information of the incoming IP terminal 1×transmitted together with the response message.

Figure 8:
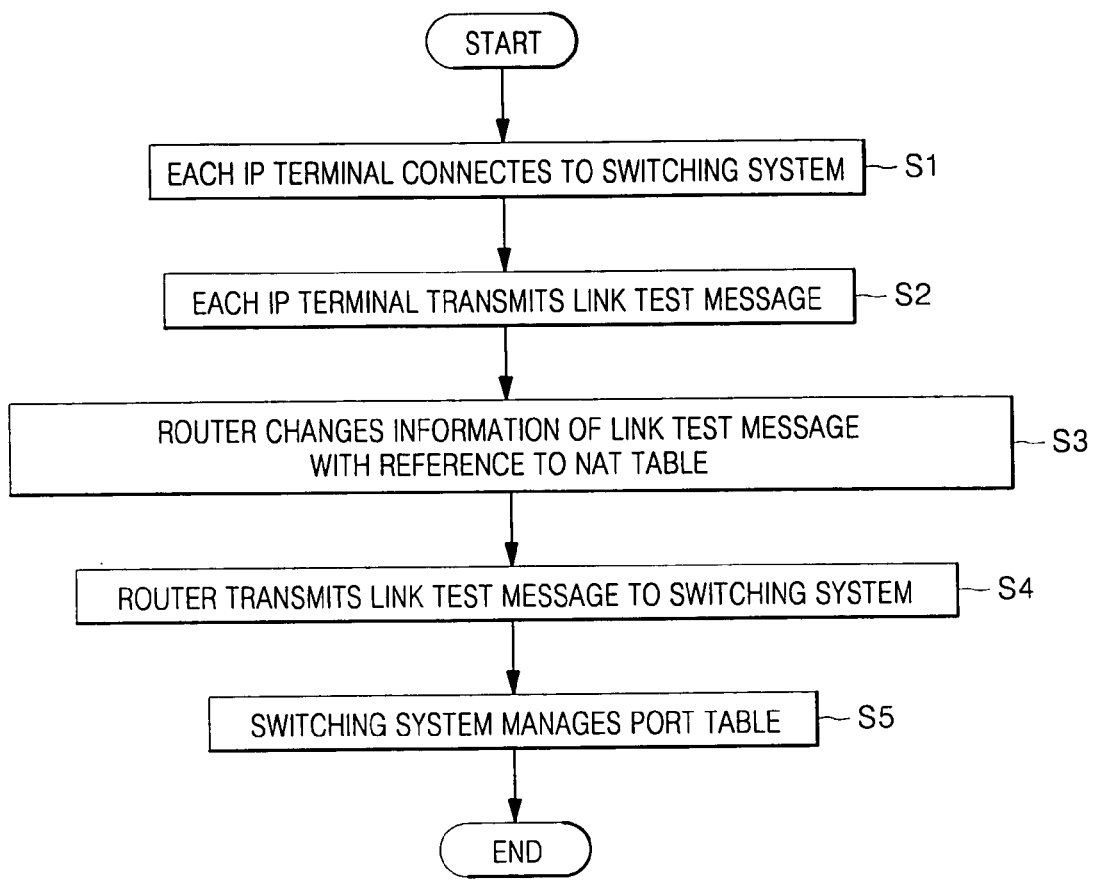
FIG. 8 is a flow chart for explaining a method for managing a port table for each IP terminal by a switching system according to a preferred embodiment of the present invention.

Turning now to FIG. 8, FIG. 8 is a flow chart for explaining a method for managing a port table for each of IP terminals according to a preferred embodiment of the present invention. Referring to FIG. 8, at first, the IP terminal 1x is connected to the switching system 30 through the IP network (SI). Each of the IP terminals 1x periodically generates the first and second link test messages, and transmits the messages to the switching system 30 (S2).

At this time, when the public IP terminal 13 transmits the first and second link test messages through the public network 60, a router #3 40 transmits the first and second link test messages transmitted from the public IP terminal 13 to the switching system 30. On the other hand, when the private IP terminals 10, 11 and 12 generate and transmit the first and second link test messages, a router #1 40 or a router #2 40 changes the private IP address set in the source IP address field (b) of the first and second link test messages transmitted from the private IP terminals 10, 11 and 12 to a corresponding public IP address, and port information set in the source port field (d) to corresponding port information (S3).

The router 40 transmits the first and second link test messages where the IP address information and port information are changed, to the switching system 30 (S4). The switching system 30 manages the port table 32a using the phone number information, the IP address information, the signaling port information and the packet port information included in the first and second link test messages transmitted from the router 40 or the public IP terminal 13 (S5). For example, a case will be explained in which the NAT table 42a shown in FIG. 5 is stored in the router 40, and the private IP terminal #1 (10) whose private IP address is '10.10.10.10', whose signaling port information is '6000', whose packet port information is '9000' transmits the first and second link messages.

Turning now to FIGS. 9A and 9B, FIGS. 9A and 9B are diagrams for explaining a construction of first and second link test messages respectively that a private IP terminal transmits according to an embodiment of the present invention. The message processing unit 102a of the private IP terminal #1 (10) periodically sets the private IP address of '10.10.10.10' in the source IP address field (b), the public IP address of the switching system 30 of '201.111.198.30' in the destination IP address field (c)', the signaling port information of the private IP terminal of '6000' in the source port field (d), the destination port information in the destination port field (e), and the phone number information of '3100' and the port sort information set in the source port field (d) in the data field (f), generates the first link test message periodically, and transmits the generated first link test message to the router #1 (40), as shown in FIG. 9A.

The message processing unit 102a periodically sets the private IP address of '10.10.10.10' in the source IP address field (b), the public IP address of the switching system of '201.111.198.30' in the destination IP address field (c), the packet port information of the private IP terminal #1 (10) of '9000' in the source port field (d), the destination port information in the destination port field (e), the phone number of '3100' in the data field (f), and the port sort information set in the source port field (d), generates the second link test message, and transmits the generated second link test message to the router #1 (40), as shown in FIG. 9B.

The port connection unit 43 of the router 40 provides the address processing unit 41a with the second link test message transmitted from the private IP terminal #1 (10). The address processing unit 41a identifies the private IP address information and port information of the private IP terminal #1 (10) from the source IP address field (b), the source port field (d) and the data field (f) of the first and second link test messages received from the port connection unit 43. The address processing unit 41a searches for the private IP address information identified from the NAT table 42a, the public IP address information corresponding to the port information, and the port information. The address processing unit 41a sets the public IP address information and port information searched from the NAT table 42a in the source IP address field (b) and the source port field (d), and transmits the information to the switching system 30.

Turning now to FIGS. 9C and 9D, FIGS. 9C and 9D are diagrams for explaining 18 first and second link test messages respectively transmitted by a router in accordance an embodiment of the present invention. Referring to FIG. 9C, the address processing unit 41a of the router 40 searches for the port information corresponding to '6000' set in the source port field (d) of the first link test message transmitted from the private IP terminal #1 (10) from the NAT table 42a, and sets the searched '7500' in the source port field (d). The address processing unit 41a searches for the public IP address corresponding to the private IP address '10.10.10.10' set in the source IP address field (b) of the first link test message from the NAT table 42a, sets the searched public IP address '201.111.198.40' in the source IP field (b), and transmits the address to the switching system 30.

As shown in FIG. 9D, the address processing unit 41a searches for the public IP address corresponding to the '110.10.10.10' set in the source IP field (d) of the second link test message transmitted from the private IP terminal #1 (10) from the NAT table 42a, and sets the searched '201.111.198.40' in the source IP address field (b). The address processing unit 41a searches for the port information corresponding to the '9000' set in the source port field (d) of the second link test message from the NAT table 42a, sets the searched '7600' in the source port field (d), and transmits the switching system 30.

At this time, the address processing unit 41a identifies the port sort information stored in the data field (f) of the first and second link test messages, and determines whether the port information set in the source port field (d) of the first and second link test messages are the signaling port information or the packet port information.

The network interface 33 of the switching system 30 provides the port management unit 31a with the first and second link test messages transmitted form the router 40. The port management unit 31a identifies the IP address information, the port information and the phone number information set in the source IP field (b), the source port field (d), and the data field (f) of the received first and second link test messages, and generates the port table 32a as shown in FIG. 7. That is, the port management unit 31a identifies the phone number information of the private IP terminal #1 (10) from the data field (f) of the first link test message transmitted from the router 40, the public IP address information from the source IP address field (b), and the signaling port information from the source port field (d). The port management unit 31a generates the port table 32a using each information of the identified private IP terminal #1 (10) and stores the table in the database 32.

At this time, the port management unit 31a identifies the port sort information stored in the data field (f) of the received link test message, and determines whether the port information set in the source port field (d) is the signaling port information or the packet port information. The port management unit 31a identifies the phone number information of the private IP terminal #1 (10) from the data field (f) of the second link test message transmitted from the router 40 and the public IP address information from the source IP address field (b), and the packet port information from the source port field (d). The port management unit 31*a* generates the port table 32*a* and stores the table in the database 32 using each of information of the identified private IP terminal #1 (10).

Figure 10:
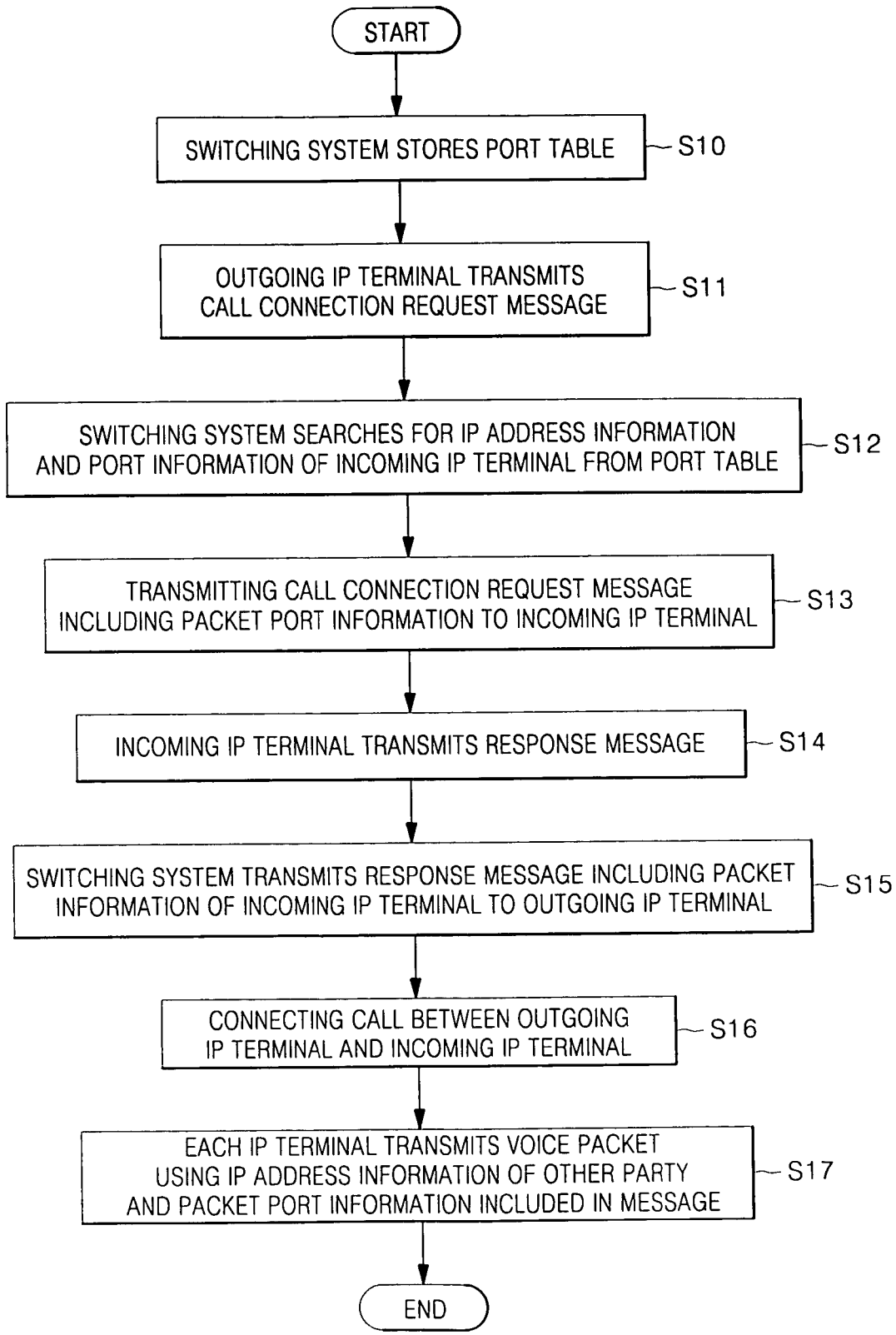
FIG. 10 is a flow chart for explaining a method for providing a private IP terminal connected to a private network with VoIP service according to a preferred embodiment of the present invention.

Turning now to FIG. 10, FIG. 10 is a flow chart for explaining a method for providing a private IP terminal connected to a private network with VoIP service according to a preferred embodiment of the present invention. Hereinafter, while a case is explained in the detailed description of the present invention in which the public IP terminal using the public IP address transmits a call connection request signal to the private IP terminal which uses the private IP address, the same is applied to the case where other private IP terminals transmit the call connection request signal to the public IP terminal or where the private IP terminal transmits the call connection request signal to the other IP terminals.

At first, each of the IP terminals 1*x* is connected to the switching system 30 and the signaling and packet ports through the IP network, and transmits the first and second link test messages. The switching system 30 stores the port table 32*a* in the database 32 as shown in FIG. 7 (S10). The public IP terminal 13 transmits the call connection request message to make the voice communication to the private IP terminal #1 (10) to the switching system 30 according to user's selection (S11).

At this time, the control unit 102 of the public IP terminal 13 generates the call connection request signal including the phone number information of the public IP terminal #1 (13) of '3100' according to an input signal provided from the user interface 101, and transmits the signal to the switching system 30. The network interface 33 of the switching system 30 provides the switching control unit 31 with the call connection request message transmitted from the public IP terminal 13, and the port management unit 31*a* searches for the public IP address information of the private IP terminal #1(10) corresponding to the phone number information of '3100' and the signaling port information included in the call connection request message (S12).

The port management unit 31*a* includes the packet port information of the public IP terminal 13 in the call connection request message, and transmits the message to the public IP address '201.111.198.40' through the searched signaling port information '7500'. The address processing unit 41*a* of the router #1 (40) searches for the private IP address corresponding the public IP address information of the call connection request message transmitted from the switching system 30 from the stored NAT table 42*a* as shown in FIG. 5, and signaling port information corresponding to the signaling port information. The address processing unit 41*a* transmits the call connection request message from the NAT table 42*a* to the private IP address information '100.10.10.1' through the searched signaling port information '6000' (S13).

The private IP terminal #1 (10) whose private IP address is '10.10.10.10' identifies the packet port information '9000' of the public IP terminal 13 included in the call connection request message transmitted from the router #1(40), generates a response message with respect to the call connection request message, and transmits the response message to the router #1 (40) through the '6000' port (S14). The router #1 (40) transmits the response message transmitted from the private IP terminal #1(10) to the switching system 30 through a '7500' port.

At this time, the address processing unit 41*a* of the router #1 (40) searches for the public IP address corresponding to the private IP address '10.10.10.10', and transmits the response message to the switching system 30 with the searched public IP address '201.111.198.40' as the source IP address. When port management unit 31*a* of the switching system 30 receives the response message from the router #1(40), it searches for the packet port information of the private IP terminal #1(10) from the port table 32*a*, includes the searched packet port information '7600' in the response message, and transmits the message to the public IP terminal 13 (SI5).

The public IP terminal 13 identifies the packet port information of the private IP terminal #1(10) included in the response message. When the private IP terminal #1(10) connects the call for voice communication according to the received call connection request message, the switching system 30 connects the call to the public IP terminal 13, and the call for voice communication between the private IP terminal #1(10) and the public IP terminal 13 (S16).

When the call is connected to the private IP terminal #1(10), the public IP terminal 13 transmits the voice packet to a packet port of the private IP terminal #1(10) identified from the response message. When the call is connected to the public IP terminal 13, the private IP terminal #1(10) transmits the voice packet to a packet port of the public IP terminal 13 identified from the call connection request message (S17). Accordingly, even when the private IP terminal #2(11) connected to the private network #1(50) is connected to the IP network using the same public IP address as the private IP terminal #1(10), '201.111.198.40', the private IP terminal #1(10) can exchange the voice packet through the packet port.

Figure 11:
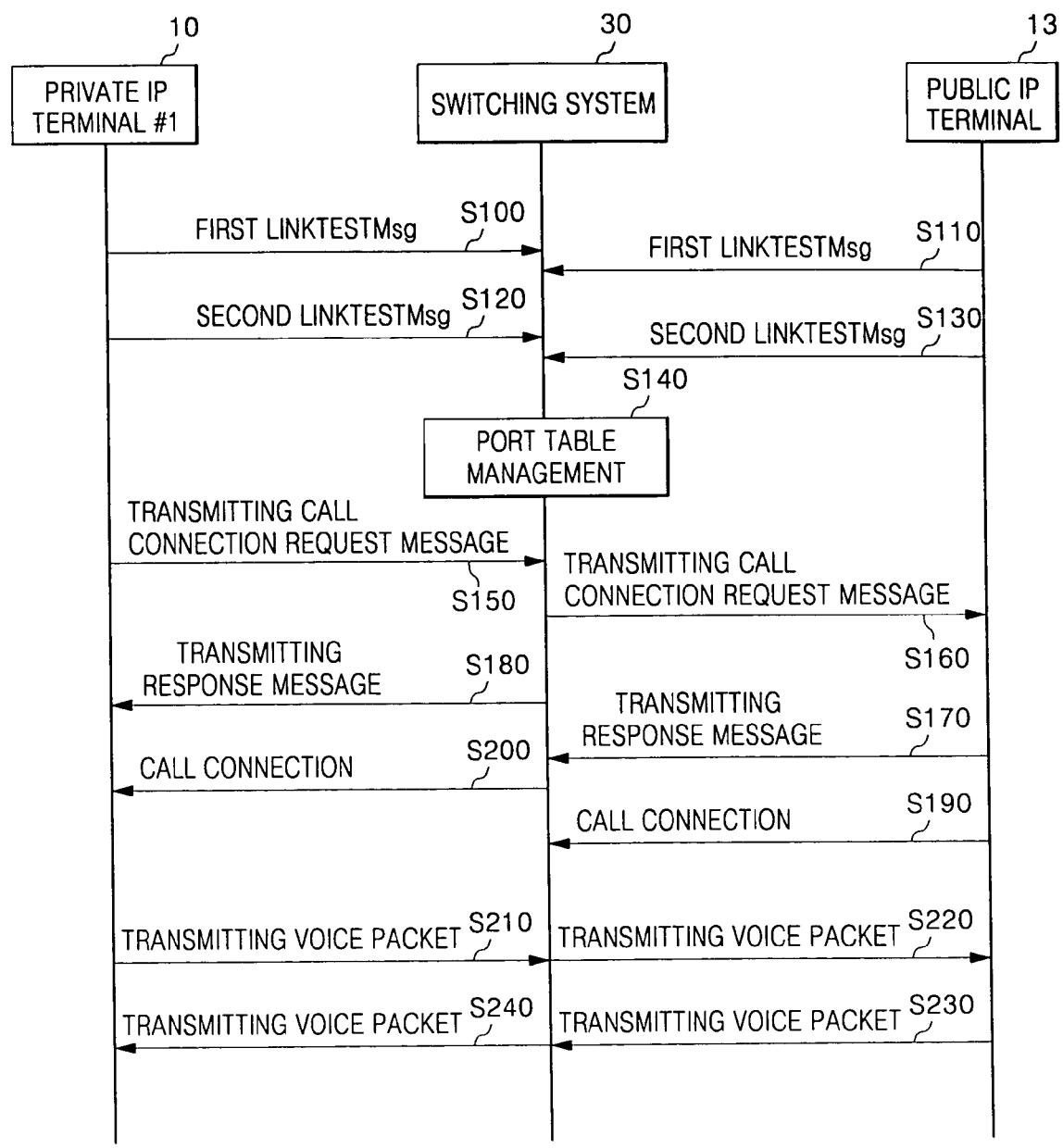
FIG. 11 is a flow chart for explaining a method for providing VoIP service according to a preferred embodiment of the present invention.

Turning now to FIG. 11, FIG. 11 is a flow chart for explaining a method for providing VoIP service according to a preferred embodiment of the present invention. Referring to FIG. 11, the private IP terminal #1(10) connected to the switching system 30 through the IP network generates the first link test message including the signaling port information in a desired period and transmits the message to the switching system (S100), and the public IP terminal 13 also generates the first link test message including the signaling port information in a desired period, and transmits the message to the switching system 30 (S110). The private IP terminal #1(10) generates the second link test message including the packet port information in a desired period and transmits the message to the switching system 30 (S120), and the public IP terminal also generates the second link test message including the packet port information and transmits the message to the switching system (S130).

The switching system 30 manages the public IP address information and each of the port information of each of the IP terminals 10 and 13 as the port table 42*a* as shown in FIG. 7 according to the link test message transmitted from the each of the IP terminals 1×(S140). The private IP terminal #1(10) generates the call connection request message according to a user's VoIP service request and transmits the message to the switching system 30 (S150).

At this time, the private IP terminal #1(10) generates a call connection request message having the public IP address information of the public IP terminal 13 of the incoming terminal as the destination IP address and transmits the message to an adjacent router #1(40). The address processing unit 41*a* of the router #1(40) searches for the public IP address information and signaling port information of the private IP terminal 10 which has transmitted 15 the call connection request message from the NAT table 42*a*, changes the source IP address included in the call connection request message to the searched public IP address information, and transmits the address information to the switching system 30 through the searched signaling port. The switching system 30 identifies the incoming IP terminal of the received call connection request message and transmits the call connection request message to the identified public IP terminal 13 (S160).

At this time, the port management unit 31a of the switching system 30 identifies the outgoing phone number information included in the received call connection request message, and searches for the packet port information used by an IP terminal of the corresponding phone number from the port table 32a. The switching system 30 includes the searched packet port information in the call connection request message and transmits the message to the public IP terminal 13 of the incoming IP terminal. That is, since the public IP address included in the received call connection request message is '201.111.198.40', the signaling port information is '7500', and the outgoing phone number is '3100', the port management unit 31a searches for the packet port information of the outgoing IP terminal, '7600' from the port table 42a. The port management unit 31a includes the packet port information '7600' in the call connection request message and transmits the information to the public IP terminal 13. When the public IP terminal 13 receives the call connection request message, it identifies the outgoing packet port information and transmits the response message to the switching system 30 (S170).

When the response message is received from the public IP terminal 13, the switching system 30 searches for the packet port information of the public IP terminal 13 from the port table 42a, includes the searched incoming packet port information in the response message, and transmits the message to the private IP terminal #1(10) (S180). That is, each of the IP terminals 10 and 13 provided with the VoIP service has to identify the packet port information of the other party with which the packet is exchanged. Therefore, the port management unit 31a of the switching system 30 transmits the packet port information of the outgoing IP terminal while transmitting the call connection request message to the incoming IP terminal, and includes the packet port information of the incoming IP terminal in the response message and then transmits the message to the outgoing IP terminal when the response message is received from the incoming IP terminal. When the public IP terminal 13 connects the call to the switching system 30 (S190), the switching system 30 connects the call to the private IP terminal #1(10) (S200).

When the switching system 30 connects the call to the public IP terminal 13, the private IP terminal #1(10) transmits the voice packet to the switching system 30 using the public IP address of the public IP terminal 13 and the packet port information included in the response message (S210). When the voice packet is received from the private IP terminal #1(10), the switching system 30 identifies the public IP address of the destination address, and transmits the voice packet to the packet port of the public IP terminal having the public IP address (S220). The public IP terminal 13 transmits the voice packet to the switching system 30 using the public IP address information and the packet port information included in the call connection request message (S230). The switching system 30 identifies the destination IP address of the received voice packet, and transmits the voice packet to the packet port of the private IP terminal #1(10) having the IP address (S240).

According to an example, the public IP terminal transmits the voice packet to the packet port information included in the call connection request message, '7600' with the public IP address of the outgoing public IP terminal, '201.111.198.40' as a destination IP address. The switching system transmits the received voice packet to the destination IP address '201.111.198.40' through the '7600' port. When the voice packet is received through the '7600' port, the router #1(40) searches for the IP terminal which uses the '7600' port as the packet port in the NAT table 42a. According to the searched result, the packet is transmitted to the private IP terminal #1(10) whose private IP address is '10.10.10.10' through a '9000' port. The private IP terminal #1(10) makes the public IP address '201.111.198.20' of the incoming IP terminal as the destination IP address, and transmits the voice packet to the '9000' port of the packet port information included in the response message.

When the voice packet is received from the private IP terminal #1(10), the router #1(40) changes the source IP address of the packet header to the corresponding public IP address and transmits the address to the switching system 30. The switching system 30 transmits to the public IP address '201.111.198.20' of the destination IP address of the received voice packet through the '9000' port.

Although the preferred embodiments of the present invention have been disclosed for illustrative purposes, those skilled in the art appreciate that various modifications, additions and substitutions are possible, without departing from the scope and spirit of the invention as disclosed in the accompanying claims.

As described above, according to the present invention, even though a plurality of public IP terminals or PCs are connected to a private network using a public IP address, a signaling message is exchanged using a signaling port between the private IP terminals or between a public IP terminal and a private IP terminal, and the voice packet is exchange through the packet port, so that a user can be provided with VoIP service through the private IP terminal.

What is claimed is:

1. A system to provide Voice over Internet Protocol (VoIP) service, the system comprising:

a plurality of Internet Protocol (IP) terminals connected to a network, at least one of said plurality of IP terminals to generate a test message and to provide the test message to the network, the test message comprising port information used when receiving and transmitting packets; and a switching system to store and manage the port information of the at least one IP terminal provided by the test message, to transmit port information of one of a transmitting IP terminal and a receiving IP terminal if VoIP service for the receiving IP terminal in a private network is requested, and to allow each of the plurality of IP terminals to receive and transmit the packets using the transmitted port information, wherein the stored port information comprises port information corresponding to a port used for exchanging voice packets and port information corresponding to a port used for exchanging signaling packets, and wherein the switching system comprises:

a reception unit to receive the test message, the voice packets, and a VoIP service request message transmitted from the transmitting IP terminal;

a port management unit to manage phone number information, IP address information, and port information of the transmitting IP terminal through the test message received by the reception unit;

a storage unit to store information managed in the port management unit; and a port processing unit to search for the port information of the transmitting IP terminal from the storage unit, the searched port information of the transmitting IP terminal being provided in the VoIP service request message, to transmit the VoIP service request message to the receiving IP terminal in response to the VoIP service request message being transmitted from the transmitting IP terminal, to search for the port information of the receiving IP terminal from the storage unit, providing the searched port information of the receiving IP terminal in a response message, and to transmit the response message to the transmitting IP terminal in response to the response message being transmitted from the receiving IP terminal, and wherein no portion of the test message is transmitted by the switching system.

2. The system according to claim 1, further comprising an address conversion unit to convert a private IP address in the test message to a corresponding public IP address in response to the at least one IP terminal being connected to the private network.

3. The system according to claim 2, wherein the address conversion unit stores the public IP address corresponding to the private IP address of the at least one IP terminal connected to the private network and port information corresponding to the port information of the at least one IP terminal, and changes the private IP address to the corresponding public IP address and the port information to the corresponding port information of the IP terminal, in response to the test message or the voice packets being transmitted from the at least one IP terminal.

4. The system according to claim 1, wherein the at least one IP terminal comprises:
 a storage unit to store IP address information, the port information, and phone number information of the at least one IP terminal;
 a message generation unit to periodically generate the test message using the IP address information, the port information, and the phone number information stored in the storage unit;
 a packet processing unit to generate the voice packets to receive the VoIP service and to transmit the voice packets using address information and port information of another IP terminal when a call is established with the other IP terminal; and
 a network interface to output the test message and the voice packets through the network.

5. The system according to claim 4, wherein the test message comprises at least one of the phone number information, the IP address information, and the port information.

6. The system according to claim 1, the port processing unit being configured to search, in the storage unit, for IP address information corresponding to the phone number information in the VoIP service request signal, and to identify the receiving IP terminal in response to the VoIP service request message being transmitted from the transmitting IP terminal.

7. An Internet Protocol (IP) terminal connected to a switching system to provide Voice over Internet Protocol (VoIP) service, the IP terminal comprising:
 a user interface to provide an input signal and a voice signal;
 a memory to store port information of the IP terminal;
 a message generation unit to periodically generate at least one test message comprising the port information stored in the memory, a VoIP service request message according to the input signal provided from the user interface, and a voice packet according to the voice signal; and
 a packet exchange unit to transmit each message generated by the message generation unit to the switching system, to identify received port information in a received VoIP service request message or a response message, and to transmit the voice packet generated by the message generation unit using the port information in response to a call being connected to another IP terminal, and wherein the stored port information comprises port information corresponding to a port used for exchanging the voice packet and port information corresponding to a port used for exchanging a signaling packet, and wherein the packet exchange unit is configured to exchange the at least one test message, the VoIP service request message, and the response message through a signaling port, and the voice packet through a packet port.

8. The IP terminal according to claim 7, wherein the user interface is configured to output voice information according to a voice packet received from the another IP terminal.

9. The IP terminal according to claim 7, wherein the at least one test message comprises:
 a first test message comprising signaling port information in a first source port field and port sort information of the first source port field in a first data field; and
 a second test message comprising packet port information in a second source port field and port sort information of the second source port field in a second data field.

10. An address conversion unit to interwork a private network with a public network, the address conversion unit comprising:
 a storage unit to store public IP address information corresponding to private IP address information of a private IP terminal connected to a private network, and first port information corresponding to port information of the private IP terminal; and
 an address processing unit to change the private IP address to the corresponding public IP address, to transmit a first packet according to the first port information corresponding to the port information in response to a packet being received from the private IP terminal, to search for the private IP address corresponding to a destination IP address of a second received packet and second port information corresponding to port information in the second received packet, and to transmit a third packet to the private IP address using the second port information in response to the second packet being received from the public network, wherein both the first port information and the second port information comprise port information corresponding to a port used for exchanging voice packets and port information corresponding to a port used for exchanging signaling packets, and wherein the port information corresponding to a port used for exchanging voice packets is received from a first test message and the port information corresponding to a port used for exchanging signaling packets is received from a second test message, the first test message being different from the second test message.

11. A switching system connected to a plurality of Internet Protocol (IP) terminals, the switching system comprising:
 a message reception unit to receive at least one test message, a VoIP service request message, and a response message;
 a port management unit to manage first port information of a transmitting IP terminal when the at least one test message is received by the message reception unit from the transmitting IP terminal; and
 a message transmission unit to search for the first port information of the transmitting IP terminal, to provide the searched first port information in the VoIP service request message, to transmit the VoIP service request message to a receiving IP terminal in response to the VoIP service request signal being transmitted from the transmitting IP terminal through the message reception unit, the message transmission unit being further configured to search for second port information of the receiving IP terminal, to provide the searched second port information in the response message, and to transmit the response message to the transmitting IP terminal in response to the response message being transmitted from the receiving IP terminal, wherein both the first port information and the second port information comprise port information corresponding to a port used for exchanging voice packets and port information corresponding to a port used for exchanging signaling packets, and wherein the port information corresponding to a port used for exchanging voice packets is received from a first test message and the port information corresponding to a port used for exchanging signaling packets is received from a second test message, the first test message being different from the second test message.

12. The system according to claim 11, wherein the port management unit is configured to manage at least one of phone number information, IP address information, and port information of the plurality of IP terminals.

13. A method for providing Voice over Internet Protocol (VoIP) service in at least one Internet Protocol (IP) terminal connected to a private network or a public network, and to a system comprising a switching system, the method comprising:

generating at least one test message comprising port information and transmitting the at least one test message to a network;

identifying, using the switching system, the port information in the at least one test message transmitted from a transmitting IP terminal and to manage the port information in a port table;

searching for the port information of the transmitting IP terminal in the port table, providing the searched port information in a VoIP service request message and transmitting the VoIP service request message to a receiving IP terminal, in response to the VoIP service request message being received from the transmitting IP terminal;

searching for second port information of the receiving IP terminal, providing the searched second port information in a response message, and transmitting the response message to the transmitting IP terminal, in response to the response message being received from the receiving IP terminal; and exchanging, by the receiving IP terminal and the transmitting IP terminal, voice packets used to receive the VoIP service if a call is established between the receiving IP terminal and the transmitting IP terminal, wherein both the first port information and the second port information comprise port information corresponding to a port used for exchanging the voice packets and port information corresponding to a port used for exchanging signaling packets, and wherein the port information corresponding to a port used for exchanging voice packets is received from a first test message and the port information corresponding to a port used for exchanging signaling packets is received from a second test message, the first test message being different from the second test message.

14. The method according to claim 13, further comprising changing the at least one test message by changing a private IP address of the transmitting IP terminal to a public IP address corresponding to the private IP address provided in the at least one test message in response to the at least one test message being received from the transmitting IP terminal connected to the private network.

15. The method according to claim 13, wherein information managed by the switching system comprises at least one of phone number information, IP address information, and port information of the plurality of IP terminals.

16. A method for providing Voice over Internet Protocol (VoIP) service by an Internet Protocol (IP) terminal connected to a switching system, the method comprising:

generating at least one test message comprising port information used to exchange a packet and transmitting the at least one test message to the switching system;

identifying port information of another IP terminal in a VoIP service request message transmitted from the switching system;

generating a voice packet to provide the VoIP service, and transmitting the voice packet to the another IP terminal through the identified port information when the switching system connects a call to the another IP terminal; and outputting voice information according to a voice packet received from the another IP terminal, and providing the VoIP service, wherein the port information comprises port information corresponding to a port used for exchanging voice packets and port information corresponding to a port used for exchanging signaling packets, and wherein the port information corresponding to a port used for exchanging voice packets is received from a first test message and the port information corresponding to a port used for exchanging signaling packets is received from a second test message, the first test message being different from the second test message.

17. A method to process address information by an address conversion unit, the method comprising:

storing private Internet Protocol (IP) address information of each of a plurality of private IP terminals connected to a private network, port information, and public IP address information corresponding to the port information;

searching for a public IP address corresponding to the private IP address information of an IP terminal and changing the private IP address to the corresponding public IP address in response to a packet being transmitted from the IP terminal; and searching for port information corresponding to port information received in the packet and transmitting a second packet using the changed IP address, wherein the stored port information comprises port information corresponding to a port used for exchanging voice packets and port information corresponding to a port used for exchanging signaling packets, and wherein the port information corresponding to a port used for exchanging voice packets is received from a first test message transmitted from the IP terminal and the port information corresponding to a port used for exchanging signaling packets is received from a second test message transmitted from the IP terminal, the first test message being different from the second test message.

18. A method to provide Voice over Internet Protocol (VoIP) service by a switching system connected to at least one Internet Protocol (IP) terminal connected to a private network or a public network, the method comprising:

identifying port information in at least one test message transmitted from each of a plurality of IP terminals and managing the port information in a port table;

searching for first port information of a transmitting IP terminal;

providing the searched first port information in a VoIP service request message;

transmitting the VoIP service request message to a receiving IP terminal in response to the VoIP service request message being transmitted from the transmitting IP terminal;

searching for second port information of the receiving IP terminal;

providing the searched second port information in the response message;

transmitting the response message to the transmitting IP terminal in response to the response message being transmitted from the receiving IP terminal; and connecting a call to provide the VoIP service between the receiving IP terminal and the transmitting IP terminal, wherein the managed port information comprises port information corresponding to a port used for exchanging voice packets and port information corresponding to a port used for exchanging signaling packets, and wherein the port information corresponding to a port used for exchanging voice packets is received from a first test message and the port information corresponding to a port used for exchanging signaling packets is received from a second test message, the first test message being different from the second test message.

* * * * *